(12) United States Patent
Baffy et al.

(10) Patent No.: US 7,377,564 B1
(45) Date of Patent: May 27, 2008

(54) ONE PIECE ISOLATOR AND STEP PAD

(75) Inventors: Jennifer Baffy, Westland, MI (US); Irfan Sharif, Canton, MI (US); Mark Nygren, Taylor, MI (US); Michael Musleh, Canton, MI (US); Vince R. Mahe, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/683,662

(22) Filed: Mar. 8, 2007

(51) Int. Cl.
*B60R 19/48* (2006.01)

(52) U.S. Cl. .................................. 293/117

(58) Field of Classification Search ............... 293/117, 293/120, 155, 102, 121, 122
See application file for complete search history.

(56) References Cited

U.S. PATENT DOCUMENTS

| | | | | |
|---|---|---|---|---|
| 2,649,308 A * | 8/1953 | Bice, Jr. | ...................... | 293/117 |
| 3,427,062 A * | 2/1969 | Struben | ...................... | 293/117 |
| 3,716,254 A * | 2/1973 | Tarvin | ...................... | 280/166 |
| 4,198,070 A * | 4/1980 | Weiler | ...................... | 280/166 |
| 4,785,910 A * | 11/1988 | Tonkovich | ................ | 280/163 |
| 5,678,872 A * | 10/1997 | Slater | ...................... | 293/117 |
| 5,829,774 A * | 11/1998 | Klemp | ...................... | 293/117 |
| 6,145,861 A * | 11/2000 | Willis | ...................... | 280/163 |
| 6,513,821 B1 | 2/2003 | Heil | | |
| 6,749,197 B1* | 6/2004 | Miller et al. | ................. | 273/117 |
| D532,354 S * | 11/2006 | Storer | ...................... | D12/203 |
| 7,156,433 B2* | 1/2007 | Evans | ...................... | 293/117 |
| 2005/0062252 A1 | 3/2005 | Vincent | | |
| 2005/0087999 A1 | 4/2005 | Campbell et al. | | |
| 2006/0192398 A1* | 8/2006 | Buniewicz et al. | ......... | 293/102 |
| 2008/0012365 A1* | 1/2008 | Harvey | ...................... | 293/120 |

* cited by examiner

*Primary Examiner*—Kiran B. Patel
(74) *Attorney, Agent, or Firm*—Gigette Bejin, Esq.; Dykema Gossett PLLC

(57) ABSTRACT

An automobile bumper including an isolator including one or more step surfaces integrally formed on the isolator. The step surface(s) may provide a gripping surface for permitting a user to step on for loading and unloading objects from the automobile. A fascia cover may be attachable to the isolator and include a cutout for allowing the step surface(s) to protrude through the cutout to prevent direct contact of the user's foot with the fascia.

20 Claims, 2 Drawing Sheets

ONE PIECE ISOLATOR AND STEP PAD

BACKGROUND OF INVENTION a. Field of Invention

The invention relates generally to components for pick up trucks, vans, SUVs and other such vehicles which allow a user to climb into the vehicle for loading and unloading, and more particularly, to a step pad and isolator assembly for respectively facilitating loading and unloading of objects into and from the vehicle.

b. Description of Related Art

As is known in the art, pick up trucks, vans, SUVs and other such vehicles generally include a bumper having a step surface for allowing a user to step onto the bumper for climbing into the vehicle to load and unload objects. The step surface generally includes a plurality of raised and grooved areas for providing a gripping area for the user to safely step on without risking slipping and without damaging the outer painted or non-painted bumper fascia.

Known designs of such step surfaces generally include a rubber or plastic step surface mounted on the top fascia of a bumper by adhesive, bolting, snap-fit engagement or other known techniques. In order to account for the user's weight onto the bumper surface, a reinforcement structure can be provided underneath the fascia. The overall bumper assembly thus generally includes at least three components, the outer fascia, a step surface and a reinforcement structure.

An exemplary bumper design is disclosed in U.S. Pat. No. 6,513,821 to Heil. Referring to FIGS. 1-3 of Heil, there is disclosed a polymeric injection molded running board 7 including a longitudinal base portion 16 with an upper first surface 28 and a lower second surface 30 opposite the first surface. The upper surface is designed to support a foot of a vehicle occupant entering or exiting the vehicle. The running board includes grip ridges 34 integrally molded with the base portion on the first surface for increasing the frictional interface between the first surface and the foot of the vehicle occupant entering or exiting the vehicle. The grip ridges include a crown region 33 and an incline portion 36 connecting the crown region with the first surface. The running board also includes reinforcing ribs 40 for strengthening the base portion, with the ribs extending from the base portion second surface and being joined to the second surface generally opposite the incline portion of the grip ridges.

Another exemplary bumper design of U.S. Patent Application Publication No. 2005/0087999 to Campbell discloses in FIGS. 1, 2, 5 and 6 thereof an integrated upper fascia and bumper energy absorber 10 including an upper fascia support member 12, a bumper energy absorber 14 and a load isolator 16 which integrally connects the upper fascia support member to the bumper energy absorber. Upper fascia support member 12 provides attachments for various attached parts of a motor vehicle. Load isolator 16 connects the upper fascia support member to the bumper energy absorber in a fixed position relative to each other and manages a load applied, relatively, to either upper fascia support member or the bumper energy absorber. This relative load distribution causes relative movement of one component from adversely affecting the other component, thus keeping vehicle damage to a minimum in the event of an impact.

While existing running board or bumper designs, such as those disclosed by Heil and Campbell, provide designs which allow a user to step onto the bumper or which distribute an applied load in a predetermined manner, there exists a need for simplifying and reducing the manufacturing and assembly steps required for such components, as well as for reducing the overall number of parts for such components.

It is therefore desirable to provide a vehicle bumper design which allows a user to climb into and out of the vehicle for respectively loading and unloading objects, with the design including a minimal number of components to thus simplify the manufacturing and assembly steps required for such components. There also exists a need for such bumper designs which are robust in design, and which are economical to manufacture and maintain from a manufacturing and material cost perspective.

SUMMARY OF THE INVENTION

The invention solves the problems and overcomes the drawbacks and deficiencies of prior art automobile step-on type bumpers by providing an automobile bumper including an isolator having one or more step surfaces integrally formed on the isolator thereby eliminating the need for a secondary step pad component. The step surface(s) may provide a gripping surface for permitting a user to step on for loading and unloading objects from the automobile. A fascia cover may be attachable to the isolator and include a variety of different shape cutouts for allowing the step surface(s) to protrude through the cutouts and prevent direct contact of the user's foot with the fascia esthetic class "A" surface.

For the automobile bumper described above, the isolator may include one or more reinforcement ribs for minimizing flexing of the automobile bumper under the user's weight. The reinforcement rib(s) may include a substantially X-shaped profile. The step surface(s) may include a plurality of grooves for providing the gripping surface. The isolator may include a plurality of cutouts for mounting of the fascia cover. The step surface(s) may include a raised portion for protruding through the cutout and one or more ribs for supporting the isolator onto an automobile bumper beam. The isolator may be made of thermoplastic polyolefin (TPO) and/or Polypropylene (PPO), Xenoy (PC+PBT), or any material capable of being used in the injection molded process.

The invention also provides an automobile including a bumper having an isolator having one or more step surfaces integrally formed on the isolator. The step surface(s) may provide a gripping surface for permitting a user to step on the bumper. A fascia cover may be attachable to the isolator and include cutouts for allowing a portion of the step surface(s) to protrude through the cutouts.

For the automobile described above, the isolator may include one or more reinforcement ribs for reducing flexing of the automobile bumper under the user's weight. The reinforcement rib(s) may include a substantially X-shaped profile. The step surface may include a plurality of grooves for providing the gripping surface. The isolator may include a plurality of cutouts for mounting of the fascia cover. The step surface(s) may include a raised portion for protruding through the cutout and one or more ribs for supporting the isolator onto an automobile bumper beam.

The invention also provides an automobile structure for permitting a user to step onto for loading and unloading objects from the automobile. The structure may include an isolator including one or more step surfaces integrally formed on the isolator. The step surface(s) may provide a gripping surface for permitting a user to step on for loading and unloading objects from the automobile. A fascia cover may be attachable to the isolator and include a cutout for allowing the step surface(s) to protrude through the cutout to prevent direct contact of the user's foot with the fascia.

For the automobile structure described above, the isolator may include one or more reinforcement ribs for minimizing flexing of the automobile structure under the user's weight. The reinforcement rib(s) may include a substantially X-shaped profile. The isolator may include a plurality of cutouts for mounting of the fascia cover. The step surface(s) may include a raised portion for protruding through the cutouts and one or more ribs for supporting the isolator onto an automobile frame member.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE PREFERRED EMBODIMENTS

Figure 1:
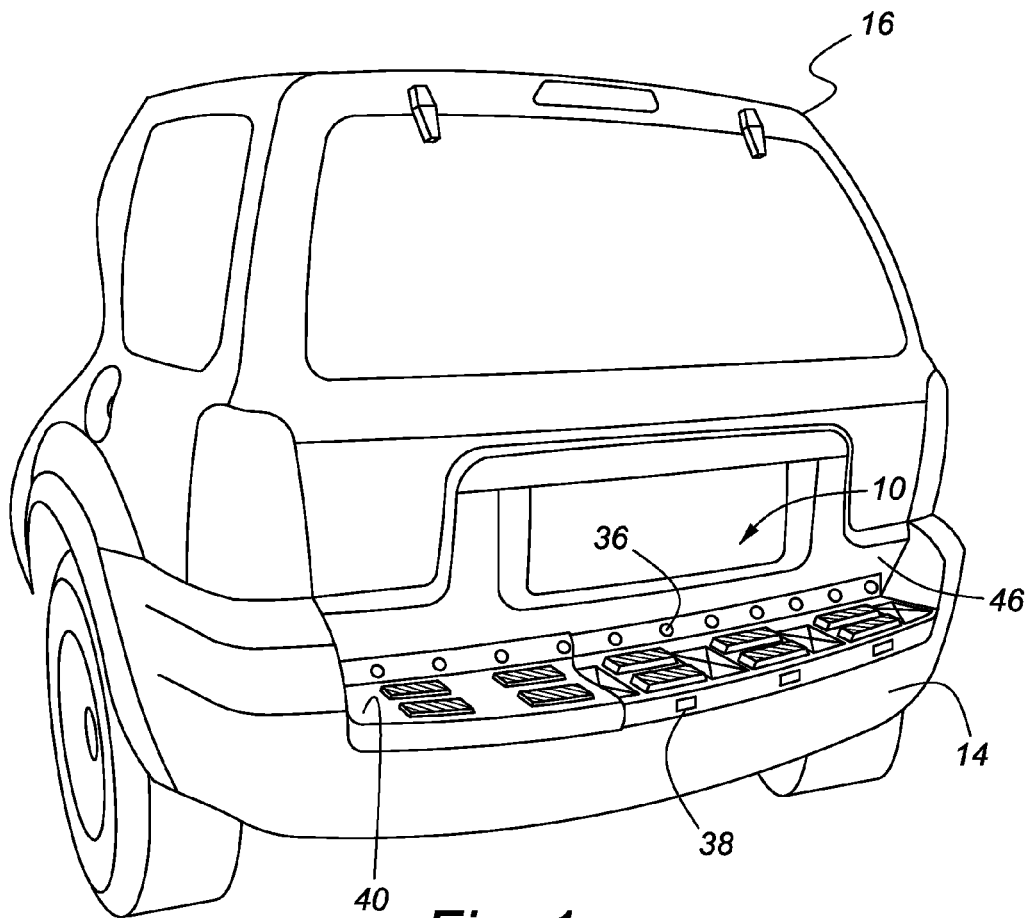
FIG. 1 is an isometric view of an integrated step pad and isolator assembly according to the present invention, illustrating the assembly in an installed configuration.

Referring now to the drawings wherein like reference numerals designate corresponding parts throughout the several views, FIGS. 1-4 illustrate various views of an integrated step pad and isolator assembly having a fascia cover mounted thereon according to the present invention, the assembly being hereinafter generally designated "integrated step pad and isolator assembly 10."

Figure 2:
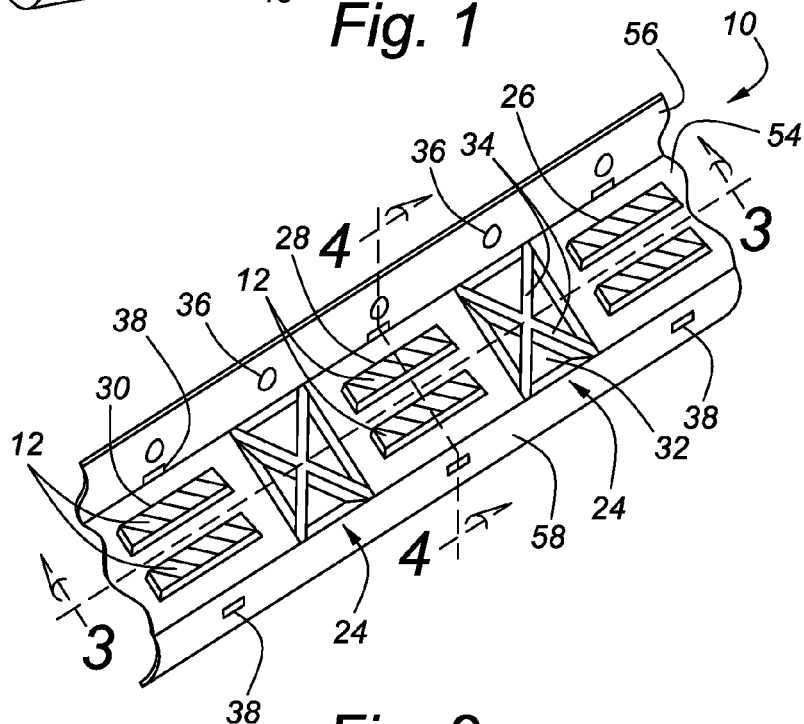
FIG. 2 is an isometric view of the integrated step pad and isolator assembly of FIG. 1.

Referring to FIGS. 1-4, integrated step pad and isolator assembly 10 may generally include a plurality of step surfaces 12 provided at spaced locations thereon for permitting a user to step onto overall bumper assembly 14 (see FIG. 1) for loading and unloading objects respectively into and from automobile 16. As shown in FIGS. 1 and 2, step surfaces 12 may include a plurality of grooves thereon for preventing the user's foot from slipping. In an exemplary embodiment, the grooves may be parallel indentations in each step surface 12. In the embodiment of FIG. 1, a typical bumper assembly 14 may include five spaced step surfaces along the central and outer edges of the bumper assembly. However, those skilled in the art would readily appreciate in view of this disclosure that the spacing and number of step surfaces 12 may be readily designed based on the overall dimensions of bumper assembly 14.

Figure 3:
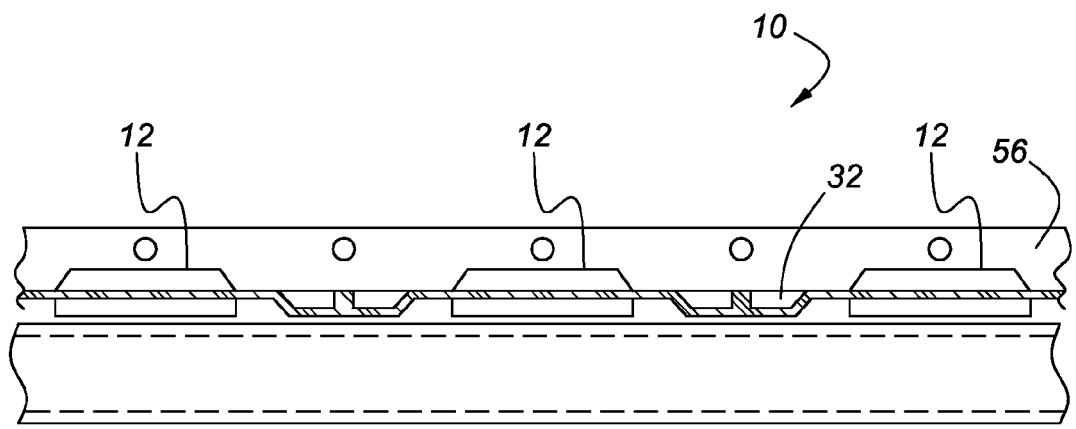
FIG. 3 is a cross-sectional view of the integrated step pad and isolator assembly of FIG. 1, taken generally along line 3-3 in FIG. 2.
Figure 4:
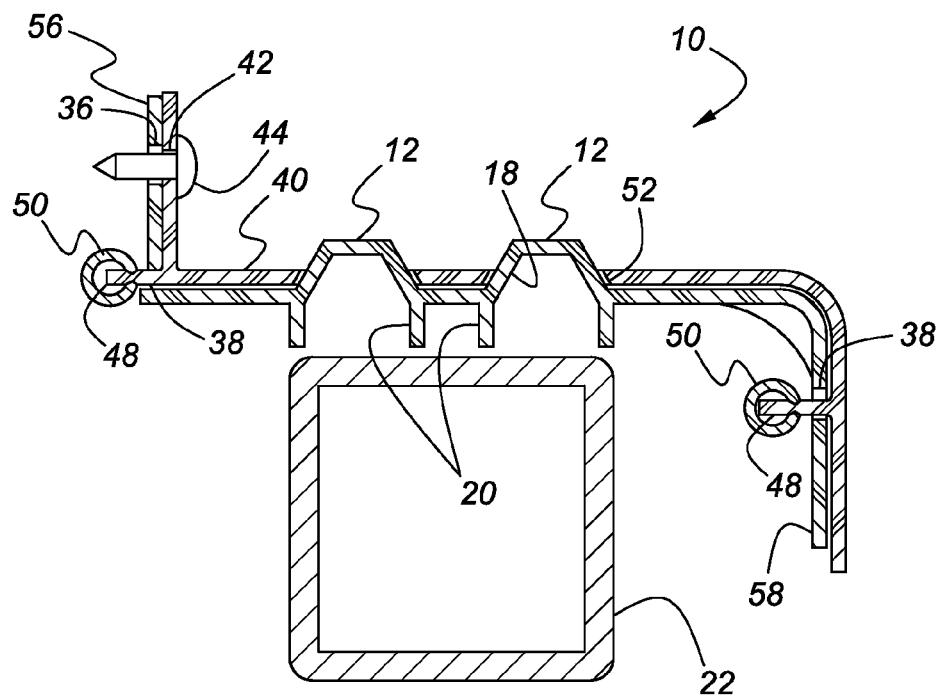
FIG. 4 is a cross-sectional view of the integrated step pad and isolator assembly of FIG. 1, taken generally along line 4-4 in FIG. 2, further including a fascia cover installed onto the step pad and isolator assembly.

In the particular embodiment of FIGS. 2-4, as illustrated, each step surface may be provided on a generally trapezoidal raised platform 18 including ribs 20 contiguously disposable against a bumper beam 22 for adequately supporting assembly 10. With the configuration of step surfaces 12 as illustrated, the generally trapezoidal profile of the step surface thus provides a rigid platform for a user to step onto. The shape of the surfaces are also dependent on particular vehicle styling as dictated during the studio process and can therefore be circular in shape as well.

In order to further rigidify integrated step pad and isolator assembly 10, a plurality of reinforcement ribbing 24 may be provided between each set 26, 28 and 30 of step surfaces 12. In the embodiment illustrated, reinforcement ribbing 24 may generally include an X-shaped profile for minimizing axial and torsional bending of assembly 10. As shown in FIGS. 2 and 3, reinforcement ribbing 24 may be provided in a concave depression 32 and include additional lateral ribs 34 for providing yet further rigidity to assembly 10. Those skilled in the art would appreciate in view of this disclosure that a variety of other reinforcement ribbing structures may be provided without departing from the scope of the present invention.

As shown in FIGS. 1, 2 and 4, integrated step pad and isolator assembly 10 may include a plurality of orifices and cutouts 36, 38 for facilitating attachment of fascia cover 40 thereon, as well as for facilitating attachment of assembly 10 to vehicle body 46. In the exemplary embodiment illustrated in FIG. 4, fascia cover 40 may include opening 42 for insertion of a pin, screw or similar fastener 44 through orifice 36 of assembly 10 into vehicle body 46, and fascia cover 40 may further include shafts 48 insertable into cutouts 38 and retained therein by clips 50. Of course, a plurality of other configurations of orifices, cutouts, openings, shafts and other known attachment techniques may be used for attachment of fascia cover 40 to integrated step pad and isolator assembly 10. As shown in FIG. 4, fascia cover 40 may also include complementary openings 52 for insertion of raised step surfaces 12.

Referring again to FIG. 2, in the embodiment illustrated, integrated step pad and isolator assembly 10 may include generally horizontal surface 54 having transverse upper and lower extensions 56, 58, respectively, formed therewith in a one piece component. As briefly discussed above, upper extension 56 may rest against and be mounted to vehicle body 46, and lower extension 58 may be provided for supporting fascia cover 40 as well as providing a surface for mounting cover 40. In this manner, integrated step pad and isolator assembly 10 acts as a support surface under fascia cover 40 for supporting the weight of a user relative to bumper beam 22.

In an exemplary embodiment of integrated step pad and isolator assembly 10, assembly 10 may be formed of thermoplastic polyolefin (TPO), Polypropylene (PPO), or other known materials used for stepping surfaces on vehicles, and include a uniform thickness of, for example, 3 mm. Assembly 10 may of course include a variable or different thickness depending on other factors such as use, impact resistance and deformation requirements, and additional weight and dimensional constraints as required for such structures.

The assembly and use of integrated step pad and isolator assembly 10 with bumper assembly 14 will now be described in detail with reference to FIGS. 1-4.

Referring to FIGS. 1 and 4, in order to assemble bumper assembly 14, assembly 10 and fascia cover 40 may be first aligned such that step surfaces 12 of assembly 10 protrude through openings 52 of fascia cover 40. Assembly 10 and fascia cover 40 may then be joined and mounted to vehicle body 46 as shown using the pin/screw and clip connections 44, 50, as discussed above.

Thus a simple two step process is required for attaching assembly 10 and fascia cover 40 to provide bumper assembly 14.

With bumper assembly 14 installed onto the vehicle, a user may simply step onto step surfaces 12 of bumper assembly 14 to load or unload objects into the vehicle.

Those skilled in the art would readily appreciate in view of this disclosure that various modifications could be made to integrated step pad and isolator assembly 10 described above, without departing from the scope of the present invention. For example, instead of the trapezoidal configuration of step surfaces 12, a variety of other configurations and layouts could be used based on design, utility and aesthetical considerations. Further, whereas assembly 10 has been illustrated as being used with bumper assembly 14, it is readily apparent that assembly 10 may be used with other side step areas, as well as with a variety of other vehicles.

To summarize, the present invention thus provides a bumper assembly including an integrated step pad and isolator assembly 10 which allows a user to climb into and out of a vehicle for respectively loading and unloading objects, with the design including a minimal number of components to thus simplify the manufacturing and assembly steps required for such components. The present invention also provides an integrated step pad and isolator assembly 10 which is robust in design, and which is economical to manufacture and maintain from a manufacturing and material cost perspective. The attachment style within the constraints of the fascia assembly can also be changed depending on the package space provided with each application of the invention.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. An automobile bumper comprising:
    an isolator including at least one step surface integrally formed on said isolator, said step surface providing a gripping surface for permitting a user to step on for loading and unloading objects from the automobile; and
    a fascia cover attachable to said isolator and including a cutout for allowing said step surface to protrude through said cutout to prevent direct contact of the user's foot with said fascia.

2. An automobile bumper according to claim 1, wherein said isolator includes at least one reinforcement rib for minimizing flexing of said automobile bumper under the user's weight.

3. An automobile bumper according to claim 2, wherein said reinforcement rib includes a substantially X-shaped profile.

4. An automobile bumper according to claim 1, wherein said step surface includes a plurality of grooves for providing said gripping surface.

5. An automobile bumper according to claim 1, wherein said isolator includes a plurality of cutouts for mounting of said fascia cover.

6. An automobile bumper according to claim 1, wherein said step surface includes a raised portion for protruding through said cutout and at least one rib for supporting said isolator onto an automobile bumper beam.

7. An automobile bumper according to claim 1, wherein said isolator is made of at least one of thermoplastic polyolefin (TPO), Polypropylene (PPO) and Xenoy (PC+PBT).

8. An automobile including a bumper comprising:
    an isolator including at least one step surface integrally formed on said isolator, said step surface providing a gripping surface for permitting a user to step on said bumper; and
    a fascia cover attachable to said isolator and including a cutout for allowing at least a portion of said step surface to protrude through said cutout.

9. An automobile according to claim 8, wherein said isolator includes at least one reinforcement rib for reducing flexing of said automobile bumper under the user's weight.

10. An automobile according to claim 9, wherein said reinforcement rib includes a substantially X-shaped profile.

11. An automobile according to claim 8, wherein said step surface includes a plurality of grooves for providing said gripping surface.

12. An automobile according to claim 8, wherein said isolator includes a plurality of cutouts for mounting of said fascia cover.

13. An automobile according to claim 8, wherein said step surface includes a raised portion for protruding through said cutout and at least one rib for supporting said isolator onto an automobile bumper beam.

14. An automobile according to claim 8, wherein said isolator is made of at least one of thermoplastic polyolefin (TPO), Polypropylene (PPO) and Xenoy (PC+PBT).

15. An automobile structure for permitting a user to step onto for loading and unloading objects from the automobile, said structure comprising:
    an isolator including at least one step surface integrally formed on said isolator, said step surface providing a gripping surface for permitting a user to step on for loading and unloading objects from the automobile; and
    a fascia cover attachable to said isolator and including a cutout for allowing said step surface to protrude through said cutout to prevent direct contact of the user's foot with said fascia.

16. An automobile structure according to claim 15, wherein said isolator includes at least one reinforcement rib for minimizing flexing of said automobile structure under the user's weight.

17. An automobile structure according to claim 16, wherein said reinforcement rib includes a substantially X-shaped profile.

18. An automobile structure according to claim 15, wherein said isolator includes a plurality of cutouts for mounting of said fascia cover.

19. An automobile structure according to claim 15, wherein said step surface includes a raised portion for protruding through said cutout and at least one rib for supporting said isolator onto an automobile frame member.

20. An automobile structure according to claim 15, wherein said isolator is made of at least one of thermoplastic polyolefin (TPO), Polypropylene (PPO) and Xenoy (PC+PBT).

* * * * *